Figure 1:
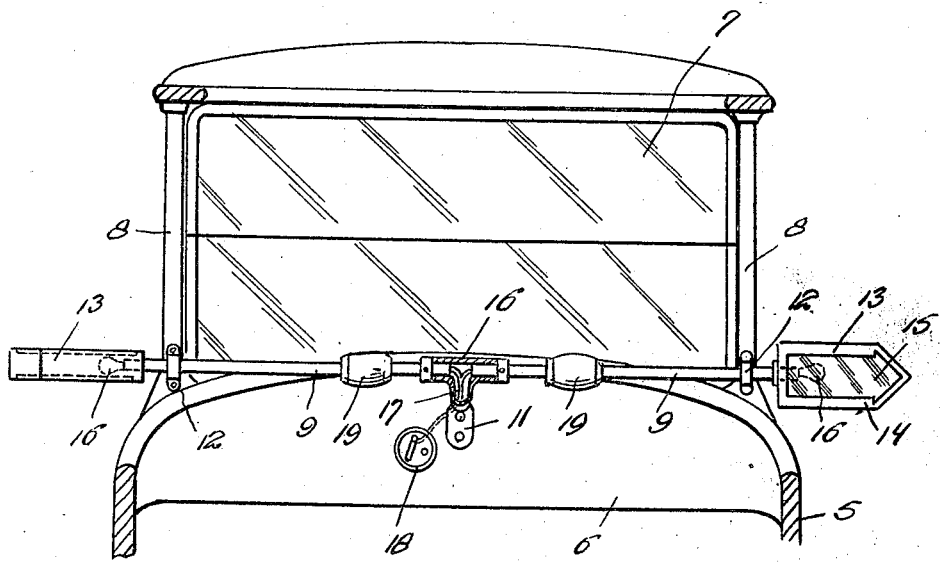

Dec. 2, 1924.

1,517,318

J. SECKSER ET AL

VEHICLE DIRECTION INDICATOR

Filed Feb. 28, 1924

Joseph Seckser,
Otto Scholl,
Inventors

By Clarence A. O'Brien
Attorney

Patented Dec. 2, 1924.

1,517,318

UNITED STATES PATENT OFFICE.

JOSEPH SECKSER AND OTTO SCHOLL, OF DODGEVILLE, MICHIGAN, ASSIGNORS OF ONE-THIRD TO HENRY SCHWENK, OF HANCOCK, MICHIGAN.

VEHICLE DIRECTION INDICATOR.

Application filed February 28, 1924. Serial No. 695,758.

*To all whom it may concern:*

Be it known that we, JOSEPH SECKSER and OTTO SCHOLL, citizens of the United States, residing at Dodgeville, in the county of Houghton and State of Michigan, have invented certain new and useful Improvements in Vehicle Direction Indicators, of which the following is a specification.

This invention relates to direction indicators for vehicles, and has, more particularly, reference to a mechanically actuated signal, whereby the driver of the motor vehicle to which the same is attached, may indicate his intentions to those both forwardly and rearwardly of the vehicle, that a turn in either a right or left hand direction is intended.

The primary object of the present invention is to provide a signal or indicator of this character that embodies a pair of signal boxes disposed upon opposite sides of the vehicle and at points adjacent the windshield thereof, said signal boxes including a source of illumination, in order that the same may be clearly viewed at nighttime, said signal boxes adapted to be normally disposed so as to have their transverse axes extend parallel to the longitudinal axis of the vehicle, means being provided whereby said signal boxes may be turned from a point within the car, in order that the same may be clearly viewed. Briefly described, our invention constitutes the provision of a pair of longitudinally extending rods that are journalled for rotation at points directly beneath the windshield of the vehicle, and that have their outer ends extended outwardly at the opposite sides of the car and to which are attached signal boxes, means being provided on said rods at points adjacent the driver's seat of the vehicle whereby the same may be turned for showing said signal boxes in elevational or end view, said first mentioned position being the indicating position of the boxes, said last mentioned position being the inoperative non-indicating position thereof.

The main object of the present invention is to provide an indicator for vehicles of this character that may be easily and cheaply manufactured and marketed and one that may be readily applied to practically all types of vehicles, in order that the intentions of the driver thereof to make a right or left hand turn may be clearly indicated without the necessity of the driver extending his arm outwardly of the machine.

With the foregoing and other objects in view, as the nature of the invention will be better understood, the same comprises the novel form, combination, and arrangement of parts hereinafter more fully described, shown in the accompanying drawing, and claimed.

Figure 2:
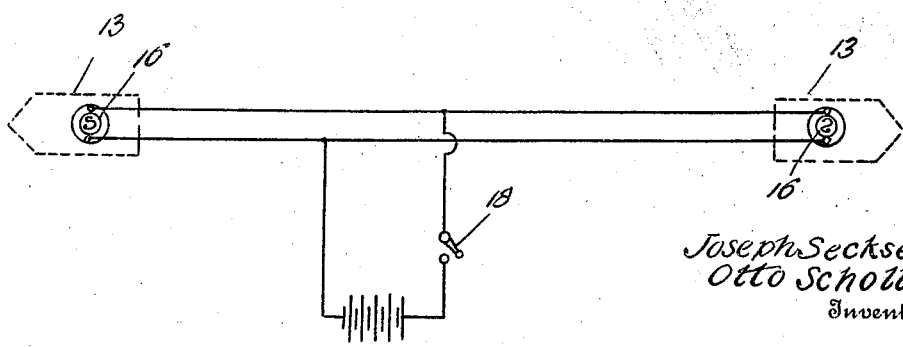

In the drawing, wherein like reference characters indicate corresponding parts throughout the views:

Figure 1 is a transverse cross sectional view through a motor vehicle equipped with our novel direction indicator, and Figure 2 is a diagrammatic view of the electrical wiring system employed in conjunction with the present invention.

Now, having particular reference to the drawings, 5 designates generally a motor vehicle that includes among other elements an instrument board 6, a windshield 7, and a windshield supporting frame 8.

Our novel direction indicator constitutes the provision of a pair of hollow rods 9—9 that are positioned in end to end relation and horizontally at a point directly adjacent the lower edge of said windshield 7. The inner ends of these rods 9—9 are journalled within a tubular bearing 10, that is formed upon the upper end of the bracket 11, that is adapted to be rigidly attached to said instrument board 6. These hollow rods 9—9 extend slightly outwardly of the side of the vehicle 5 and are journalled adjacent these ends within bearings 12—12 secured to the windshield supporting frame as at 8—8.

Disposed upon the outer end of these hollow rods 9—9 are spaced signal boxes 13—13, the front and rear walls of which are formed with arrow shaped cut-outs 14, within which are disposed arrow shaped glass panels 15.

The ends of the hollow rods 9—9 extend within said signal boxes 13—13 and are equipped with electric lamps 16—16 that are electrically connected through the medium of wires 17, that extend through said hollow rods, to a source of electrical energy, preferably the storage battery of the vehicle. Disposed within the line of circuit, between said electric bulbs 16—16 and the said source of energy, is an electric switch 18, that is also disposed upon the instrument board 6, and at a point preferably adjacent the driver's seat of a vehicle, and it will, of course, be apparent that whenever desirable, the circuit may be completed to the electric bulb by a turning of said switch 18.

Adjacent their inner ends, said hollow rods 9—9 are equipped with turn knobs 19—19 and in this instance, it might be well to note that the normal running position of the signal boxes 13—13 is a position similar to that of the left hand signal box shown in Figure 1. In other words, when the vehicle is going in a straight line, the transverse axes of these signal boxes 13—13 are to extend parallel to the longitudinal axis of the vehicle, in order that the sides of these boxes may not be viewed. However, when it is desired to make either a right or left hand turn, the proper one of the rods 9 is turned to position the respective signal box in side elevation, or in the position shown at the left of Figure 1.

From the foregoing, it will be readily apparent that we have provided a highly novel, simple, and efficient form of direction indicator, and one that will not only anticipate all of the foregoing objects, but one that will meet with all of the requirements for a successful commercial use.

Minor changes may be made in the invention without departing from the spirit and scope of the appended claim.

Having thus described our invention, what we claim as new and desire to secure by Letters Patent is:

A direction indicator for vehicles comprising a bracket adapted to be mounted on the instrument board of the vehicle, said bracket being provided with a horizontally elongated tubular bearing, a pair of separate bearings adapted to be mounted on the windshield standards, a pair of hollow independently rotatable rods journalled in said bearing, signal boxes carried on the outer ends of said rods, said boxes being oblong and provided with pointed outer ends, and hand gripping knobs secured to the rods between the bearings to permit selective rotation of the rods and bearings for rendering the signal boxes operative or inoperative.

In testimony whereof we affix our signatures.

JOSEPH SECKSER.
OTTO SCHOLL.